Patented June 20, 1944

2,351,985

UNITED STATES PATENT OFFICE 2,351,985

PROCESS FOR THE PRODUCTION OF CADMIUM RED

Johannes Loeffler, Berlin-Dahlem, Germany; vested in the Alien Property Custodian No Drawing. Application August 2, 1940, Serial No. 350,065. In Germany July 5, 1939

9 Claims. (Cl. 106—301)

This invention relates to the production of a red pigment containing cadmium sulfide and selenium which pigments may be used for various purposes, for instance, in the ceramic and glass industry, for glazes, furthermore as filling materials in plastic masses, artificial resins, caoutchouc and the like.

It is known to produce red colored selenium containing pigments in such manner that cadmium sulfide and selenium are heated to high temperatures whereby a conversion to cadmium selenide and free sulphur takes place. Owing to the high reaction temperatures sulphur escapes leaving behind a mixed substantially red colored crystal, formed of CdSe and CdS. This process, however, has various disadvantages. Thus, in consequence to the high temperatures considerable quantities of selenium escape and are therefore lost. Furthermore, undesired coarseness of grain will occur which exerts an unfavourable influence on the quality of the final product. This disadvantage is even enhanced by the fact that the degree of conversion varies in wide ranges according to the degree of heating and the duration of heating. In consequence thereto the reaction products are not uniform. This imperfect uniformity of the final product is very disagreeable, especially with respect to colors and pigments where a distinct shade of color must be reproduceable.

Now it was found that a valuable cadmium red may be obtained in an especially advantageous manner if mixtures containing cadmium sulfide and selenium or substance splitting off selenium are subjected to a heat treatment in the presence of such substances which are able to remove the sulphur set free at the reaction. Such substances are, for instance, oxidation means such as ammonium nitrate or other nitrates and nitrites, or also reduction means such as hydrazin hydrate. The sulphur set free in the reaction is oxidised by these substances, i. e. transformed into $SO_2$ or reduced, i. e. converted into hydrogen sulfide or volatile sulfides. These last mentioned substances escape from the reaction mixture during the reaction thereby causing a complete removal of the free sulphur. Similar effect will be obtained by the use of phosphorous, arsenic or antimony as additions whereby the sulfides thus formed escape during the reaction.

-My invention may be carried out also in such manner that the reaction mixture is heated in the presence of such substances which convert the sulphur into such compounds which first remain in the reaction mixture and may afterwards easily be removed by washing out. Such substances are, for instance, alkali metal nitrates or nitrites, and alkaline substances such as hydroxides of carbonates. These addition means convert the free sulphur into alkali sulfates or sulfites or into polythionates. Further additional substances are light metals, such as magnesium, which are able to bind sulphur without blocking up selenium in a substantial degree. Reduction means may also be used as additions, such as for instance, hydrides or amides of the alkali or earth alkali metals. In this case the sulphur liberated in the reaction is converted into sulfhydrates or sulfides. In the same manner organic compounds may be employed which tend to easily combine with sulphur. These substances are, for instance, olefinic compounds (di-olefines, terpenes and so on) or organic amines such as diphenylamine. The best effects were obtained by using cyanides as sulphur removing additional substances. These substances are converted into thiocyanides which afterwards may very easily be removed by washing with water. The production of cadmium red may be carried out in the presence of cyanides, for instance, potassium cyanide, sodium cyanide, calcium cyanide at very low temperatures which cause the formation of especially valuable pigments. If desired, the selenium may be combined with the cyanides to selenium cyanide and then brought to reaction with cadmium sulfide.

The so formed sulphur compounds are later on removed by washing out with suitable solvents. Sulfates, sulfites or sulfides may, for instance, be washed out with water. Sometimes it has proved expedient to take diluted aqueous acids for this purpose, for instance, phosphoric acid, formic acid, acetic acid. The use of stronger acids or acids with higher concentration is in general not to be recommended as it may lead to a partly decomposition of the cadmium red. Also organic solvents, such as benzene, may be used for the washing out step.

My invention may be carried out very simply in such manner that cadmium sulfide or mixtures containing thereof are heated in a crucible or the like together with selenium or selenium giving substances. Substances which deliver selenium are, for instance, the selenides or polyselenides of the alkali metals or other metals. According to my invention the metallic cation serves in this case as a means for the removal of sulphur and in consequence thereto the formation of the cadmium red is due to a double reaction. A further substance which delivers selenium is selenious acid. In using this initial material the addition of a reduction means is necessary.

Moreover, the formation of cadmium red according to my invention may also be carried out in the presence of so-called "mineralizers," for instance, sodium chloride. Furthermore, the conversion may also be carried out in the presence of inert filling materials, such as for instance, barium sulfate.

Now I have found that the conversion of the reaction mixture may expediently be carried out at lower temperatures than hitherto known and used. In general, my invention may be carried out at temperatures below about 600° C., preferably between 200 and 500° C. The best results will be obtained in the lower ranges between 200 and 350° C. This is particularly possible through the addition of cyanides, as already mentioned above.

According to my invention it is possible to obtain an extremely divided cadmium red. As these particular fine-grained pigments are especially active in a chemical sense and tend to glow pyrophorously in the presence of the oxygen of the air and at moderate temperatures, I recommend to carry out the reactions and the subsequent cooling in the absence of oxidising gases, preferably in the presence of inert of reducing gases, such as carbon-dioxide, nitrogen on one hand or hydrogen, carbon monoxide on the other hand. In this manner I may obtain pigments of any desired size of grain after addition of mineralizers or by choosing the most suitable temperature. In all cases, especially in the manufacture of fine-grained cadmium red, pigments of excellent intensity and purity of shades will be obtained. Moreover, according to my invention it is possible to always obtain the same quality and shades of color if the fixed conditions of working are strictly observed. A further advantage lies in the fact that losses of selenium are practically avoided if the operation is carried out according to my invention.

The pigments may be utilized as color pigments for varnishes, mastics, films, further as color pigments for ceramic purposes such as the manufacture of glasses, glazes or the like and finally as coloring filling substances, for instance for plastic masses, artificial resins, caoutchouc or the like.

What I claim is:

1. A process for preparing cadmium red pigments which consists in heating a mixture containing cadmium sulfide and selenium, there being present in said mixture during said heating a material which will react with and thus remove the free sulfur liberated during the process.

2. A process for the preparation of cadmium red pigments which consists in heating a mixture containing cadmium sulfide and a material which yields selenium during the reaction, said mixture being heated together with a material which will react with and thus remove sulfur set free during the reaction.

3. A process for preparing cadmium red pigments which consists in heating a mixture containing cadmium sulfide and selenium, there being present in said mixture during said heating an oxidizing agent which reacts with and removes sulfur liberated during the reaction.

4. A process for preparing cadmium red pigments which consists in heating a mixture containing cadmium sulfide and selenium, there being present in said mixture during said heating ammonium nitrate, said ammonium nitrate reacting with and thus removing sulfur liberated during the reaction.

5. A process for preparing cadmium red pigments which consists in heating a mixture containing cadmium sulfide and selenium, there being present in said mixture during said heating a reducing agent which reacts with and thus removes sulfur liberated during the reaction.

6. A process for preparing cadmium red pigments which consists in heating a mixture containing cadmium sulfide and selenium, there being present in said mixture during said heating a substance which reacts with sulfur liberated during the reaction, said sulfur thereby being converted to a form wherein it may be removed from said pigment by subsequent washing with a dilute aqueous solution of a weak acid.

7. A process for preparing cadmium red pigments which consists in heating a mixture containing cadmium sulfide and selenium, there being present in said mixture during said heating the cyanide of an alkali or alkaline earth metal selected from the group which consists of sodium cyanide, potassium cyanide, and calcium cyanide, said metal cyanide reacting with sulfur liberated during the reaction, thereby converting said sulfur to a thiocyanide which may be removed from said pigment by subsequent washing with a dilute aqueous solution of a weak acid.

8. A process for preparing cadmium red pigments which consists in heating a mixture containing cadmium sulfide and selenium at a temperature not exceeding 600° C., there being present during said heating an alkali metal cyanide which reacts with and thereby converts sulfur liberated during the reaction into the form of thiocyanide, in which form said sulfur may be removed from said pigment by subsequent washing with a dilute aqueous solution of a weak acid.

9. A process for preparing cadmium red pigments which consists in heating a mixture containing calcium sulfide and selenium at a temperature between 200 and 500° C., there being present in said mixture during said heating an alkali metal cyanide which reacts with and thereby converts sulfur liberated during the reaction into the form of thiocyanide, in which form said sulfur may be removed from said pigment by subsequent washing with a dilute aqueous solution of a weak acid.

JOHANNES LOEFFLER.